Nov. 7, 1961 W. KOBER 3,008,062
DYNAMOELECTRIC MACHINE
Filed Dec. 12, 1957
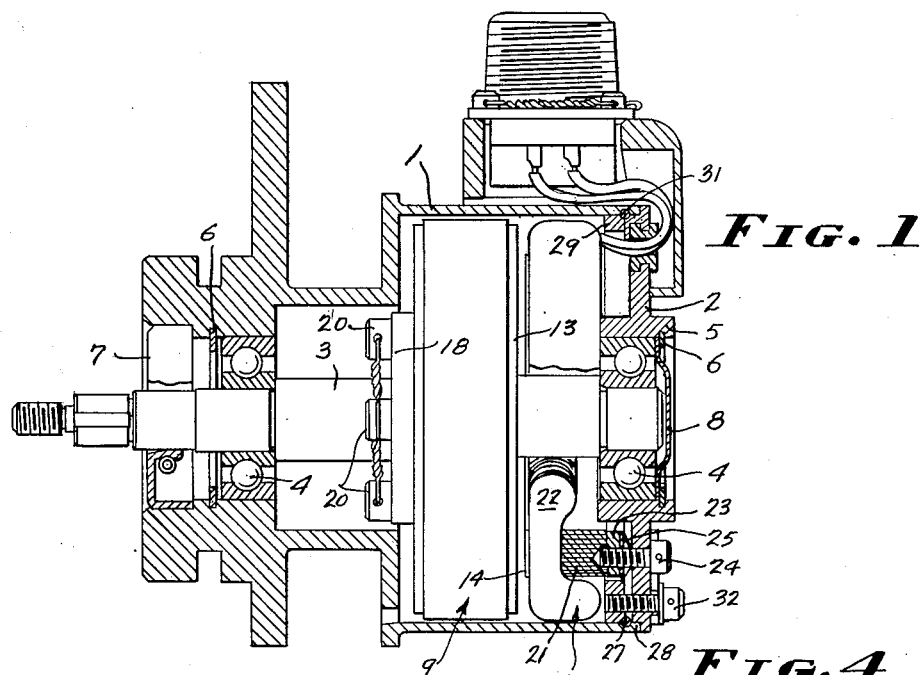
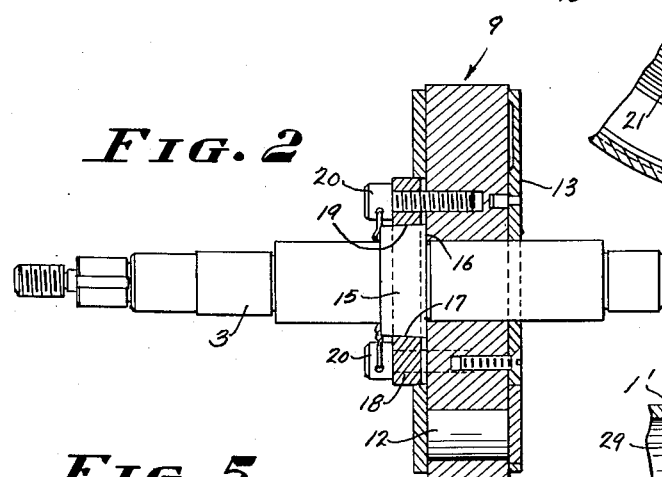
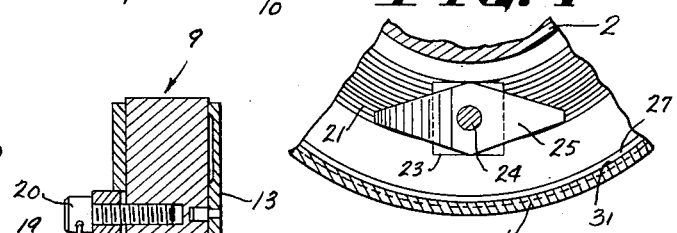
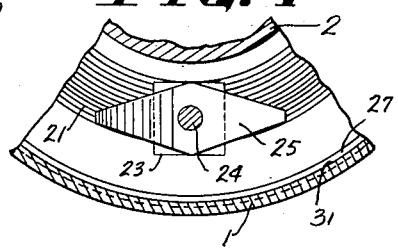
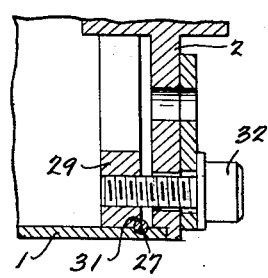
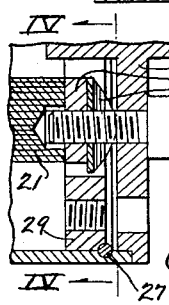
INVENTOR:
WILLIAM KOBER
BY:
Beau, Brooks, Buckley & Beau,
ATTORNEYS.

United States Patent Office 3,008,062
Patented Nov. 7, 1961

3,008,062
DYNAMOELECTRIC MACHINE
William Kober, Fairport, N.Y., assignor to TKM Electric Corporation, Rochester, N.Y.
Filed Dec. 12, 1957, Ser. No. 702,344
11 Claims. (Cl. 310—268)

This invention relates generally to the dynamoelectric art, and more specifically to certain new and useful mounting and fastening arrangements particularly adapted for use in dynamoelectric machines.

It is a primary object of this invention to provide means for locking a rotor to its shaft, for securing a positionally adjustable stator to its mounting member, for securing such a mounting member to a housing, and for securing housing sections together, all in a manner offering certain advantages over arrangements previously used for this purpose while being relatively simple and inexpensive in construction, readily assembled, and extremely durable and dependable in operation.

The foregoing and other objects, advantages and characterizing features of my invention will become clearly apparent from the ensuing detailed description of certain presently preferred forms thereof, taken in conjunction with the accompanying drawings illustrating the same wherein like reference numerals denote like parts throughout the various views and wherein:

FIG. 1 is a vertical sectional view, taken centrally, of a generator constructed in accord with the instant invention, certain parts being shown in elevation;

FIG. 2 is a similar view of the shaft and rotor assembly;

FIG. 3 is a fragmentary sectional view, on an enlarged scale, of the stator mounting arrangement;

FIG. 4 is a sectional view thereof taken about on line IV—IV of FIG. 3;

FIG. 5 is a fragmentary, sectional view, on an enlarged scale, of the end bell securing arrangement; and FIG. 6 is an enlarged, sectional view of another fastening arrangement.

Referring now in detail to the accompanying drawing, there is shown by way of example a generator having a housing comprising a generally cup-like casing 1 and an end bell 2 adapted to be secured to one end thereof. A shaft 3 is journaled adjacent its opposite ends in bearings 4 carried one by casing 1 and the other by end bell 2 which is provided with an annular center section 5 for this purpose. The bearings 4 engage at their inner ends against shoulders formed on shaft 3, and are held in position thereagainst as by means of snap rings 6, with a shaft seal 7 being provided adjacent one end of the assembly and a dust cover 8 adjacent the opposite end thereof. A rotor, generally designated 9, is carried by shaft 3, and a stator, generally designated 10, is mounted on the end bell 2.

The illustrated construction is of the axial air-gap type, as disclosed and described more fully in my Patent 2,719,931 granted October 4, 1955. Thus rotor 9 carries permanent magnets 12 in substantial parallelism with the axis of rotation of shaft 3 and a pole piece construction generally designated 13 is fitted against one end of the rotor assembly 9, facing the teeth 14 of stator 10. The working surfaces 13 and 14 of rotor 9 and stator 10, respectively, lie in substantially parallel planes at substantially a right angle to the axis of rotation of shaft 3, being spaced apart lengthwise to provide what is known as an axial air-gap construction.

Because the length of the air-gap is critical, it is important not only that rotor 9 be locked to shaft 3 for rotation therewith, but also that its axial position lengthwise of shaft 3 be fixed.

In accord with the instant invention, such mounting of rotor 9 on shaft 3 is accomplished by means including a lateral enlargement 15 formed on shaft 3 and comprising an integral portion thereof. Enlargement 15 has an annular shoulder 16 lying in a plane at substantially a right angle to the axis of shaft 3, for receiving the back face of rotor 9 in abutting relation thereagainst, and the position of shoulder 16 lengthwise of shaft 3 determines the axial position of rotor 9 thereon.

The periphery of enlargement 15 is tapered, away from shoulder 16, as shown at 17, and a locking ring 18 having a similarly tapered inner circumference 19 is slip-fitted thereon, bearing snugly against enlargement 15 at a point intermediate the opposite ends of tapered portion 17. Then, bolts 20 or other suitable fastenings are fitted through apertures in locking ring 18 and threaded into rotor assembly 9, and are tightened so as to draw rotor 9 against shoulder 16, and locking ring 18 toward rotor 9, until locking ring 18 is tightly wedged on the tapered surface 17 of enlargement 15. At this point, rotor 9 is securely held in its predetermined axial position on shaft 3 and is securely locked to the shaft for rotation therewith.

Stator 10 comprises annular laminations 21 formed to provide the teeth 14 and having windings 22 therein, the laminations being secured together as by a back plate or plates 23 welded thereto. Stator 10 is mounted on end bell 2, by means enabling positional adjustment of stator 10 relative to rotor 9 to bring their working surfaces into parallelism and to vary the length of the air-gap, generally in the manner previously set forth in my Patent 2,784,332, issued March 5, 1957.

Thus, there are provided bolts 24 extending through end bell 2 into threaded engagement with the back plates 23, which bolts are individually adjustable to accomplish the aforesaid adjustment.

It is a particular feature of this invention that especially designed spring means 25 are interposed between end bell 2 and stator 10 to urge the latter toward rotor 9, thereby operating in conjunction with the magnetic attraction between rotor 9 and stator 10 to hold the stator in its adjusted position. To this end, springs 25 are of the leaf type, being centrally apertured to receive mounting bolts 24 therethrough, and are formed so that in their normal, unstressed condition they are bowed to the shape of an arc of a circle or an arc of a cylinder. This is done so that, as the springs are stressed by tightening bolts 24, they flatten out smoothly without buckling, wrinking or other non-uniform distortion such as might otherwise occur, whereby a uniform flexing action is provided. A single spring could be used with each bolt 24, but I believe that multiple, stacked springs are preferable.

Further, each spring 25 is generally diamond shaped in plan view form, tapering from its center toward its opposite ends which latter, however, do not come quite to a point. This constant reduction in width with increasing distance from the center produces a substantially constant spring bending moment throughout each spring 25, thereby providing a substantially uniform maximum fibre stress throughout the length of the spring, and thus utilizing the metal of the spring at uniform high efficiency while avoiding stress concentrations that would tend to cause breakage of the spring.

Thus, the geometrical configuration of spring 25 is of importance for purposes of the invention. In addition, it has the advantage that because of its tapered formation on opposite sides of center, as compared with a rectangular form, the outer ends of the spring do not interfere with the casing 1 and/or adjacent machine parts, thereby avoiding any necessity of a special design to accommodate the springs.

Another feature of importance in the instant invention is the means for securing end bell 2 to the casing 1. This is accomplished by a locking arrangement including a split, resilient locking ring 27 lying in a groove around casing 1 adjacent end bell 2, ring 27 being of circular cross section and its groove being semi-circular in the illustrated embodiment. End bell 2 has a shouldered periphery 28, thereby to slip-fit into the end of casing 1 with its peripheral edge abutting thereagainst. An annular locking ring member 29 closely fits the circumference of casing 1 on the opposite side of ring 27 from end bell 2, and is semi-circularly grooved, as indicated at 31, to partially receive and overlie ring 27. Bolts 32 or other suitable fastenings extend through end bell 2 into threaded engagement with locking ring member 29, and upon tightening bolts 32 end bell 2 is drawn tight against casing 1 and locking ring 29 is drawn toward end bell 2, bearing tightly against ring 27 in a manner serving to lock end bell 2 against casing 1 and to lock ring 27 in its groove.

Thus, there is provided an end bell fastening arrangement which is extremely simple in operation, while being highly durable and dependable.

The locking ring 27 may also be of square or rectangular cross-section, when the groove in the casing 1 has a substantially rectangular shape, and the ring member 29 will have a square shoulder, one part to contact locking ring 27 endwise, and the other or cylindrical surface to trap the ring 27 to prevent it from moving inwardly out of engagement with the groove in casing 1. It is clear that other cross-sectional shapes and orientations of lock ring 27 can also be adapted to the principle of the invention, in which member 29 first traps the lock ring in its groove, and then moves against it to take up its load.

Indeed, this type of fastening can be adapted readily to other situations, such as that illustrated in FIG. 6 wherein, instead of using a cup-like casing 1 with an end bell 2, the housing is formed of plural sections 1', each of which is provided with a peripheral groove adjacent the juncture between the sections, with a ring 27 lying in each groove. Opposed locking members 29 fit within casing sections 1' on opposite sides of rings 27, being grooved to overlie the same, and bolts 32' or other fastenings extend therebetween for drawing them together.

In addition, an aligning ring 34 can be positioned between opposed locking members 29, being trapped and confined therebetween while bearing against each section 1' adjacent the juncture therebetween. Aligning ring 34 thereby maintains the adjoining casing sections 1' in longitudinal alignment.

Of course, the fastening arrangement need not be on the inside of the casing sections or housing, but instead the various parts could be placed on the exterior thereof. Also, while developed and disclosed primarily for fastening together parts of a dynamoelectric machine, I believe that this type of fastening arrangement has a much wider potential and can be adapted to other uses.

Accordingly, it is seen that my invention fully accomplishes its intended objects. While only certain forms thereof are shown in detail herein, I do not thereby intend that my invention be limited to such details. Instead, I recognize that modifications and variations will readily occur to those skilled in the art, without departing from the spirit of my invention, and I intend to encompass the same within the scope of the appended claims.

Having fully disclosed and completely described my invention, and its mode of operation, what I claim as new is:

1. In a dynamoelectric machine, a shaft journaled for rotation about the lengthwise axis thereof, a rotor, and means mounting said rotor on said shaft in a predetermined position axially therealong for rotation therewith, said last-named means comprising a lateral enlargement of said shaft integral therewith, one side of said enlargement receiving said rotor thereagainst in abutting relation therewith and thereby providing a predetermined position of said rotor axially along said shaft, said enlargement having a peripheral portion tapering away from said one side thereof, a locking ring fitted on said peripheral portion, and fastening means interlocking said rotor and said locking ring, said fastening means being adjustable to draw said rotor against said one side of said enlargement and to draw said locking ring toward said rotor and bind said locking ring on said tapered peripheral portion of said enlargement, whereby said rotor is secured to said shaft for rotation therewith in a predetermined position axially therealong.

2. In a dynamoelectric machine, a shaft journaled for rotation about the lengthwise axis thereof, a rotor fitted on said shaft and having a surface alined at substantially a right angle to said axis, and means mounting said rotor on said shaft for rotation therewith in a predetermined position axially therealong comprising, a lateral enlargement integral with said shaft, said enlargement providing a shoulder extending at substantially a right angle to said shaft and abutting said rotor surface to thereby define a predetermined position of said rotor axially along said shaft, a peripheral portion of said enlargement being tapered in the direction of said axis away from said shoulder, a locking ring fitted on said peripheral portion, and fastening means securing said rotor to said locking ring, said fastening means being adjustable to draw said rotor surface against said shoulder and to draw said locking ring along said tapered peripheral portion toward said rotor to bind said locking ring on said enlargement and thereby lock said rotor to said shaft in a predetermined position axially therealong for rotation therewith.

3. An axial air gap dynamoelectric machine comprising, a housing, a shaft journaled in said housing, a stator carrier by said housing, a rotor carried by said shaft, said stator and said rotor having generally parallel working surfaces spaced apart lengthwise of said shaft to provide an axial air gap between said working surfaces, and means mounting said rotor on said shaft including a lateral enlargement integral with said shaft, said enlargement having a shoulder abutting said rotor and defining a predetermined position of said rotor axially along said shaft, said enlargement also having a peripheral portion tapering in a direction away from said shoulder, a locking ring on said peripheral portion, and fastening means securing said locking ring to said rotor, said fastening means being adjustable to draw said rotor along said shaft against said shoulder and thereby position said rotor along said shaft and to draw said locking ring along said peripheral portion toward said rotor and thereby lock said rotor to said shaft for rotation therewith.

4. An axial air gap generator as set forth in claim 3, wherein said stator is mounted in said housing by means enabling positional adjustment for said stator to bring its working surface into parallelism with that of said rotor and to vary the length of said air gap, whereby the position of said stator can be selectively adjusted relative to the predetermined position of said rotor.

5. An axial air gap dynamoelectric machine comprising, a housing, a shaft journaled in said housing, a stator carried by said housing, a rotor carried by said shaft, said stator and said rotor having generally parallel working surfaces spaced apart lengthwise of said shaft, and means mounting said rotor on said shaft including a lateral enlargement integral with said shaft, said enlargement having a shoulder abutting said rotor to position the same axially of said shaft and a peripheral portion tapering in a direction away from said shoulder, a locking ring on said peripheral portion, and fastening means securing said locking ring to said rotor, said fastening means being adjustable to draw said locking ring along said peripheral portion toward said rotor and thereby lock said rotor to said shaft for rotation therewith, wherein said housing includes a casing and an end bell therefor, means locking said end bell on said casing, one end of said shaft being journaled in said end bell, and means mounting said stator on said end bell, said last-named means including fastening means securing said stator to said end bell, said fastening means being individually adjustable to bring the working surface of said stator into parallelism with that of said rotor and to vary the length of said air gap, and spring means biasing said stator away from said end bell and against said stator fastening means, said spring means being resiliently yieldable to permit adjustment of said stator.

6. An axial air gap generator as set forth in claim 5, wherein said spring means comprise normally semi-circularly bowed spring means of generally diamond shaped plan view form.

7. An axial air gap generator as set forth in claim 5, wherein said end bell is secured to said casing by means including means defining a groove in said casing adjacent said end bell, a ring in said groove, a locking ring member closely fitting said casing and positioned on the side of said groove opposite said end bell, said locking ring member having a grooved portion overlying said ring and confining it in said casing groove, and fastening means securing said end bell to said locking ring member.

8. In an axial air gap generator, a housing, a shaft journaled in said housing, a rotor carried by said shaft for rotation therewith, a stator, said stator and said rotor having substantially parallel working surfaces spaced apart along the axis of rotation of said shaft, and means mounting said stator in said housing including a mounting member, fastening means securing said stator to said mounting member, said fastening means being adjustable to permit positional adjustment of said stator working surface relative to said rotor working surface, and leaf spring means of generally diamond shaped plan view form biasing said stator toward said rotor.

9. In a dynamoelectric machine, a casing comprising a pair of tubular sections in end to end relation, means defining a groove in each of said sections adjacent the juncture therebetween, ring means fitted in each of said grooves, and held thereby against movement endwise of said sections toward said juncture a pair of opposed locking members closely fitting said sections on the remote sides of said ring means, said locking members being grooved to overlie said ring means and thereby confine them in said grooves, said ring means preventing movement of said locking members past said ring means toward said juncture and fastening means extending between said locking members and drawing them together.

10. The construction set forth in claim 9, together with an alining member confined between said locking members and bearing against each of said sections adjacent said juncture to maintain said sections in endwise alinement.

11. In a dynamoelectric machine, a casing having a circumferential groove adjacent one end thereof, a part held against said one end of said casing, a ring in said groove, a locking member closely fitting said casing on the side of said ring opposite said part, said locking member being grooved to overlie said ring and retain the same in said groove, said ring preventing movement of said locking member past said ring toward said part, and fastening means connected to said locking member and to said part for drawing them toward each other.

References Cited in the file of this patent

UNITED STATES PATENTS

| | | |
|---|---|---|
| 2,407,032 | Myers | Sept. 3, 1946 |
| 2,712,952 | Lundgren | July 12, 1955 |
| 2,890,071 | Johnson | June 9, 1959 |

FOREIGN PATENTS

| | | |
|---|---|---|
| 186,057 | Germany | May 6, 1907 |
| 872,090 | Germany | Mar. 30, 1953 |

UNITED STATES PATENT OFFICE
CERTIFICATE OF CORRECTION

Patent No. 3,008,166

November 14, 1961

Carlton E. Lay

It is hereby certified that error appears in the above numbered patent requiring correction and that the said Letters Patent should read as corrected below.

Column 1, line 72, after "Stitching" insert -- 29 --; column 2, line 24, strike out "which forms"; line 31, strike out "coupling", first occurrence; same column 2, line 58, for "hand" read -- and --; column 3, line 11, for "that" read -- than --.

Signed and sealed this 15th day of May 1962.

(SEAL)
Attest:

ERNEST W. SWIDER
Attesting Officer

DAVID L. LADD
Commissioner of Patents